Figure 1:
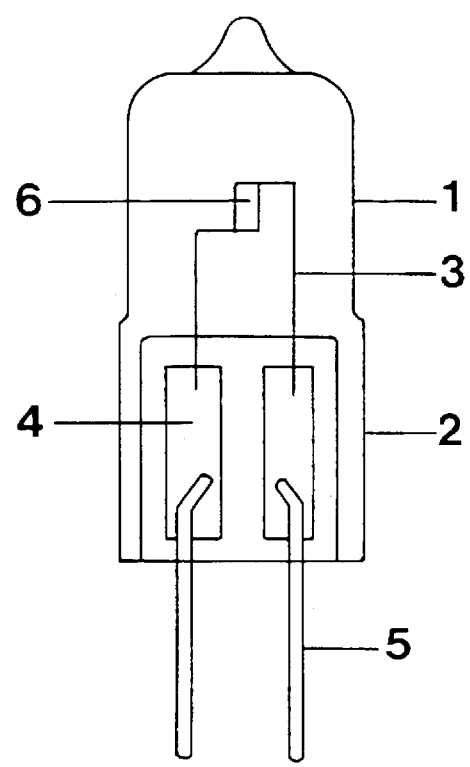

United States Patent [19]
Dobiasch et al.

[11] Patent Number: 5,896,007
[45] Date of Patent: Apr. 20, 1999

[54] HALOGEN INCANDESCENT LAMP WITH HEAT TRANSFER BY CONDUCTION

[75] Inventors: Peter Dobiasch, Traunstein; Rolf Minder, Nattheim; Karlheinz Vogl, Dollnstein, all of Germany

[73] Assignee: Patent Treuhand Gesellschaft Fur Elektrische Gluehlampen MBH, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/656,206

[22] PCT Filed: Dec. 22, 1994

[86] PCT No.: PCT/DE94/01526

§ 371 Date: Jun. 13, 1996

§ 102(e) Date: Jun. 13, 1996

[87] PCT Pub. No.: WO95/17764

PCT Pub. Date: Jun. 29, 1995

[30] Foreign Application Priority Data

Dec. 22, 1993 [DE] Germany .................. 43 43 989

[51] Int. Cl.$^6$ ...................... H01K 1/50
[52] U.S. Cl. .............. 313/578; 313/579; 313/628; 313/631
[58] Field of Search ............ 313/578, 579, 313/569, 573, 574, 628, 631, 634

[56] References Cited

U.S. PATENT DOCUMENTS 3,435,272  3/1969  Green .
3,626,236  12/1971 Robinson et al. ............... 313/276
4,280,076  7/1981  Walsh ........................... 313/580
4,338,540  7/1982  Sovilla .......................... 313/579
4,463,277  7/1984  DeCaro .
4,480,212  10/1984 Monahan et al. ............... 313/113
4,524,302  6/1985  Berlec ........................... 313/578
4,703,220  10/1987 Walsh .
4,959,585  9/1990  Hoegler ......................... 313/578
4,965,485  10/1990 Tarumi et al. .................. 313/578

FOREIGN PATENT DOCUMENTS 0 241 911  10/1987  European Pat. Off. .
0 295 592  12/1988  European Pat. Off. .
2 436 495  11/1980  France .
2 231 520  1/1974   Germany .

OTHER PUBLICATIONS

Int. J. Heat Mass Transfer, vol. 30, No. 4, pp. 663–672, 1987, article by S.M. Corea: "Fluid flow and heat transfer in incandescent lamps".

"Technisch–wissenschaftliche Abhandlungen der Osram–Gesellschaft" ("Technological–scientific papers of the Osram Company"), vol. 9, published by Springer, Berlin Heidelberg New York, 1967, article by H. Schirmer, I. Stober and J. Friedrich: "Über die Methode von Langmuir zur theoretischen Behandlung gasgefüllter Glühlampen" ("With regard to the method of Langmuir for the theoretical treatment of gas–filled incandescent lamps"), pp. 125–136.

*Primary Examiner*—Vip Patel
*Attorney, Agent, or Firm*—Frishauf, Holtz, Goodman, Langer & Chick

[57] ABSTRACT

An incandescent halogen lamp is operated under convection-free conditions. In this way, light yields of about 15 to 20 lm/W with service lives of about 2000 hours can be attained. The important parameters are the bulb dimensions, luminous element dimensions, and fill gas properties.

14 Claims, 16 Drawing Sheets

13 bar Xe 1 bar Xe

| Mounting position | Bulb temperature in °C ||
|---|---|---|
| | Fill pressure 13 barXe | Fill pressure 1 barXe |
|  | 240 | 220 |
|  | 315 | 240 |
|  | 195 | 185 |
|  | 225 | 200 |

HALOGEN INCANDESCENT LAMP WITH HEAT TRANSFER BY CONDUCTION

FIELD OF THE INVENTION

The invention relates to incandescent halogen lamps closed on one end, particularly for general lighting (AB), but also for photographic or projection purposes (FO) or other applications. In particular, it is applicable to low-voltage lamps with low power, but it can also be used for high- and medium-voltage lamps.

BACKGROUND

Lamps of the type to which the invention relates are known for instance from German Patent Disclosure DE-OS 22 31 520. Their cold fill pressure is typically approximately 5 to 15 atm of an inert gas, predominantly noble gases (argon, krypton, xenon), which optionally have a slight proportion (5 to 10%) of nitrogen. Traces of one or more halogen compounds are also added, whose partial pressure amounts to only a few millibars.

In such lamps, predominantly for general lighting purposes, the attainment of a relatively long service life (AB: 2000 hours, FO 200 hours and more) is a major goal. To achieve this, the assumption is generally made that the evaporation rate of the tungsten material of the luminous element must be damped by means of the highest possible fill pressure (in halogen lamps approximately 2.7 to 10.7 bar (approximately 2000 Torr), according to H. Lohmann, Elec-trotechnik [Electrical Engineering], 1986, pp. 33–36 and particularly page 35. At the same time, the halogen compound present as a fill component, with the aid of the convection occurring in the bulb, supports a cycle process for the tungsten particles evaporating from the luminous element (S. M. Correra, Int. J. Heat Mass Transfer 30, p. 663, 1987). However, the convection also causes a considerable heat loss, which is on the order of magnitude of 10% of the lamp power.

In general, it has until now been considered indispensible to maintain such operating conditions, in order to be able to achieve a high light yield (up to 25 lm/W) with a simultaneously high lamp life (at least 2000 hours).

For special reasons, it is true that special lamps with a low cold fill pressure have been individually developed (European Patent Disclosure DE-A 295 592), but on the precondition that nevertheless the convection that drives the halogen cycle takes place. A further example of this is French Patent Disclosure FR-A 2 436 495. It describes a photographic lamp pinched on both ends, in which the cold fill pressure is lowered to about 0.2 bar in order to reduce the risk of explosion. This is achieved at the usual cost of reducing the service life. Moreover, in U.S. Pat. No. 4,463,277, an incandescent halogen lamp with a cold fill pressure of about 0.8 to 0.93 bar is described. The low pressure is intended to enable the use of hard glass.

An essential role in the theoretical discussion of incandescent lamps is played by the concept of the Langmuir layer, which has been explained in detail, for instance in Techn. Wissenschaftl. Abhandlungen der OSRAM GmbH (TWAOG) [Industrial Science Papers published by OSRAM GmbH], Vol. 9, pp. 125–136, 1967, Springer-Verlag, Berlin. Here the existence of a horizontal stationary gas layer, in fact the Langmuir layer, adjacent to the luminous element, which is considered to be a cylinder, is assumed, and is observed to be homogeneous and of constant diameter. In it, heat removal takes place solely by heat dissipation, while outside this layer the heat losses are determined by free convection.

In incandescent halogen lamps, the Langmuir layer thickness is on the order of magnitude of a few millimeters (see also the aforementioned German Patent Disclosure DE-OS 22 31 520). It is dependent on the fill pressure.

From European Patent Disclosure EP-A 0 241 911, an incandescent halogen lamp with a luminous element with a wire diameter on the order of magnitude of 100 μm is known.

Special conditions pertain in soffit lamps, that is, elongated incandescent lamps pinched on both ends with an axially arranged luminous element. Here, if there is a deviation from the horizontal position (and particularly in a vertical burning position), severe problems arise in operation, having to do with the demixing that occurs between the fill gas and the halogen additive inside the bulb. In U.S. Pat. No. 3,435,272 and in an article in Illum. Engin., April 1971, pp. 196–204, the cooperation of diffusion and convection at a fill pressure of 0.5 to 15 bar is; said to be responsible for this thermally-caused demixing effect. This effect is suppressed by means of a glass tube introduced into the bulb and surrounding the luminous element. A similar concept is also presented in U.S. Pat. No. 4,703,220. Here the glass tube is intended to partially suppress convection.

The invention describes an entirely new way to furnish incandescent halogen lamps as defined by the preamble to claim 1, which makes possible a relatively high light yield and at the same time a long lamp life.

This novel technical teaching is based on the characteristics of the body of claim 1. Especially advantageous features are found in the dependent claims.

While the prevailing teaching was based on a linear relationship between the fill pressure and service life, entirely surprisingly, it has also been demonstrated that under certain peripheral conditions, namely in lamps with thin wires as the luminous element material, values for the light yield and service life can be attained that are even equivalent to those at high pressures. The wires preferably have a maximum diameter of 200 μm, and especially preferably-less than 100 μm. Excellent improvements can be attained in lamps with wire diameters of below 50 μm. The cause for this performance is that with small wire diameters, instead of the evaporation mechanism, some other failure mechanism determines the service life of the wire, namely the migration of the tungsten along the wire. At very small wire diameters, the grain structure of the wire makes itself strongly felt, since only from one to two grains are present across the wire diameter. The migration of the tungsten makes itself felt at the grain boundaries in the form of constrictions between the grains. This process is known as "grain boundary corrosion". This failure mechanism is independent of the fill pressure; on the other hand, it is highly dependent on the surface temperature of coiled wire (typical temperature values are approximately 2300 to 3200K). Under the operating conditions assumed here, this failure mechanism is surprisingly sharply reduced.

A decisive consequence of the altered failure behavior is the correspondingly altered failure characteristic. Typically, the failure behavior of a number of lamps follows a modified Gaussian distribution, which is known as a Weibull distribution. It is characterized by the mean value (time period until failure of 63.2% of a set of lamps) and a certain deviation range (variance). Until now, for a mean value of typically 7000 hours, this variance was typically 5000 hours.

In other words, the variance was very large in comparison with the mean value. By comparison, in lamps according to the invention, quite a different failure behavior can be observed. Although the mean value of the Weibull distribution is markedly low-voltage lamps (up to 60 V), the field of use of the invention is practically unlimited. In high- and medium- voltage lamps (more than 60 V operating voltage), the invention can be used without restriction only for tubular lamps.

With lamps pinched on one end, however, care must be taken to assure that sparkovers between current-carrying parts be avoided.

The maximum cold fill pressure that is attainable without convection is generally markedly higher in high-voltage lamps than in low-voltage lamps, specifically being between 1 and 5 bar. This is due to the generally larger dimensions of these lamps. In the 8case of high-voltage lamps, the intended "convection-free", mode of operation is therefore advantageous only if certain disadvantages can be overcome. In general, it has in fact been demonstrated that lamps operated convection-free exhibit a markedly lesser dependency on the mounting location (for instance, this is of interest for tubular lamps). The background for this is the improved uniformity of temperature distribution at the bulb found in convection-free lamps (a 50% improvement in variance is typical) and in general the trend to lower luminous element and bulb temperatures. Both effects lead to an improvement in the service life.

As a consequence, such lamps can also especially advantageously be used in reflectors or light fixtures. This is true for both high-voltage and low-voltage versions. A reduction in the temperature load by 10%, measured at the lamp pinch, over "high-pressure lamps" is typical.

By suitable geometrical dimensioning of the lamp it is also possible in the mode of the convection-free fill pressure range, instead of a simple linear dependency of the power losses (when plotted logarithmically), to create one region of linear dependency at low pressures and one region (plateau) at higher pressures, in which the power loss is virtually independent of the pressure a longitudinal axis of the luminous element is defined. The luminous element may be located either parallel or vertical to the end of the bulb, which is typically closed with a pinch seal. The bulb shape may be cylindrical but may also assume some other shape. Typical internal dimensions (the inside diameter in the case of the cylindrical shape, for instance) are between 3 and 15 mm, but larger values are possible as well. Examples of photoelectric data are from 10 to more than 20 lm/W (minimum value 1 m/W) for a service life of 2000 hours.

The advantages of the invention are expressed particularly markedly in low-voltage, low-power lamps. The fill volume of the bulb in low-voltage lamps is on the order of magnitude of 0.05 to 1 cm$^3$ and in high-voltage lamps up to 15 cm$^3$. A noble gas, optionally with the admixture of nitrogen, is used as the fill gas. A typical cold fill pressure is 0.5 to 1.7 bar in low- voltage lamps and up to 5 bar in high-voltage lamps. Halogenated hydrocarbons are examples of suitable halogen compounds.

The luminous element dimensions themselves also have an influence on operating performance. For instance, the enveloping cylinder of the luminous element should advantageously be shaped such that its length is at least equal to the diameter; in particular, it can be more than 1.5 times and preferably more than 2 times greater than the diameter.

The core factor and pitch factor of the luminous element also have an influence on the convection behavior. A point of departure for the pitch factor is a value of less than 2.0. The specific value in an individual case, however, must be arrived at empirically.

The color temperature of the lamps of the invention is in a range from about 2400 to 3400K. In general, it is true that the present invention is advantageously applicable both to lamps closed on one end and lamps closed on both ends. The closure is typically done by pinching, but can optionally also be done by fusing. In lower (typically 4000 hours), the variance in the mean service life is so sharply reduced that the 3% value (that is, the service life until the first 3% of the lamps fail) can nevertheless be equally favorable or even more favorable than in lamps according to the known prior art. This means that the time period between the failure of 3% of the set of lamps and the failure of 63.2% of the set is sharply reduced, corresponding to a substantially steeper slope of the Weibull distribution. Thus despite a poorer mean service life, an approximately equivalent or even more-effectively usable service life (hereinafter called the rated service life) can be attained (defined as the time period defined by the service life of the first 3% of a set of lamps).

A further particular advantage of the invention is that under the operating conditions according to the invention, faceting of the surface of the coiled wire can be avoided. Faceting describes the phenomenon in which the individual grains of the wire material in lamp operation begin to grow in accordance with their actually cubic space-centered lattice structure. As a result, for one thing the wire surface becomes uneven, and for the other the radiant wire surface area is enlarged. This process generally leads to a reduction in the residual light flux that is normally measured after 75% of the rated service life. Lamps according to the invention now exhibit the astonishing phenomenon that the residual light flux is markedly greater than in comparison lamps. An increase in the light flux over the initial value can even occur. The cause is suspected again to be the tungsten migration along the surface, which has a smoothing and equalizing effect on the surface profile.

The incandescent halogen lamps according to the invention normally have a high-temperature-proof bulb of quartz glass or hard glass. The luminous element contained in it is shaped (typically as a single or double coil) cylindrically or at least approximately cylindrically (a slightly curved cylinder, for instance), so that range. This plateau behavior is especially suitable for attaining the operating state at relatively low pressure according to the invention even in high-voltage lamps. This is because the plateau makes it possible to choose the "operating point" not solely preferentially just below the transition point at which the convection ensues but rather to adjust the pressure to a markedly lower value within the plateau or also at the beginning of the plateau.

In general, the risk of sparkover in high-voltage lamps can be varied by means of a fill gas mixture of noble gas with a small (up to about 10%) addition of nitrogen.

Further advantages of the invention are reduced gas consumption (which is especially significant when expensive xenon is used) and increased security against bursting.

Finally, in terms of the strain on the coil, it should be noted that high-pressure lamps (that is, lamps impinged upon by convection) not only have a markedly higher coil temperature but also a smaller radiant surface area than corresponding low-pressure lamps (that is, operated convection-free) having the same photometric data.

Low-pressure halogen lamps overall exhibit quite a different failure behavior, similar to that of conventional incandescent lamps, from high-pressure halogen lamps. "Low pressure" here generally always means the pressure that assures the freedom from convection, in comparison with the higher pressure ("high pressure,") involving convection, for a particular lamp type. While in one lamp type a cold fill pressure of 2 bar can still belong to the "low-pressure" range, in another lamp type a cold fill pressure of 0.8 bar can already be considered part of the "high-pressure range". A reliable statement about this for each lamp type can be made by measurement of the power loss as a function of the fill pressure and by determination of the transition point.

Figure 2:
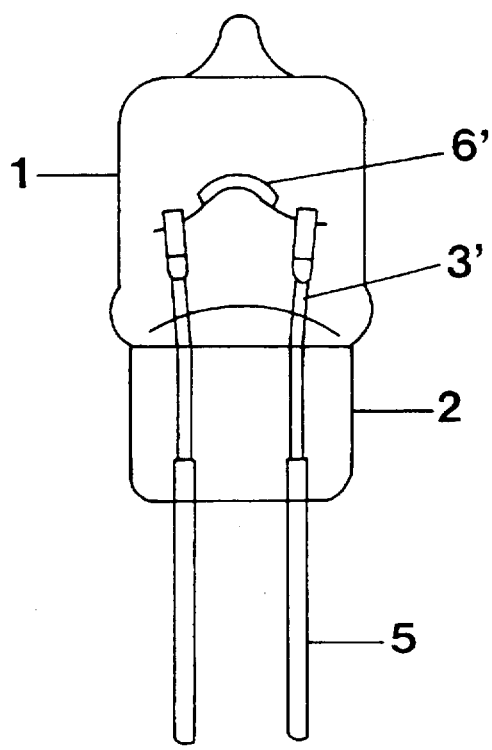
Figure 3:
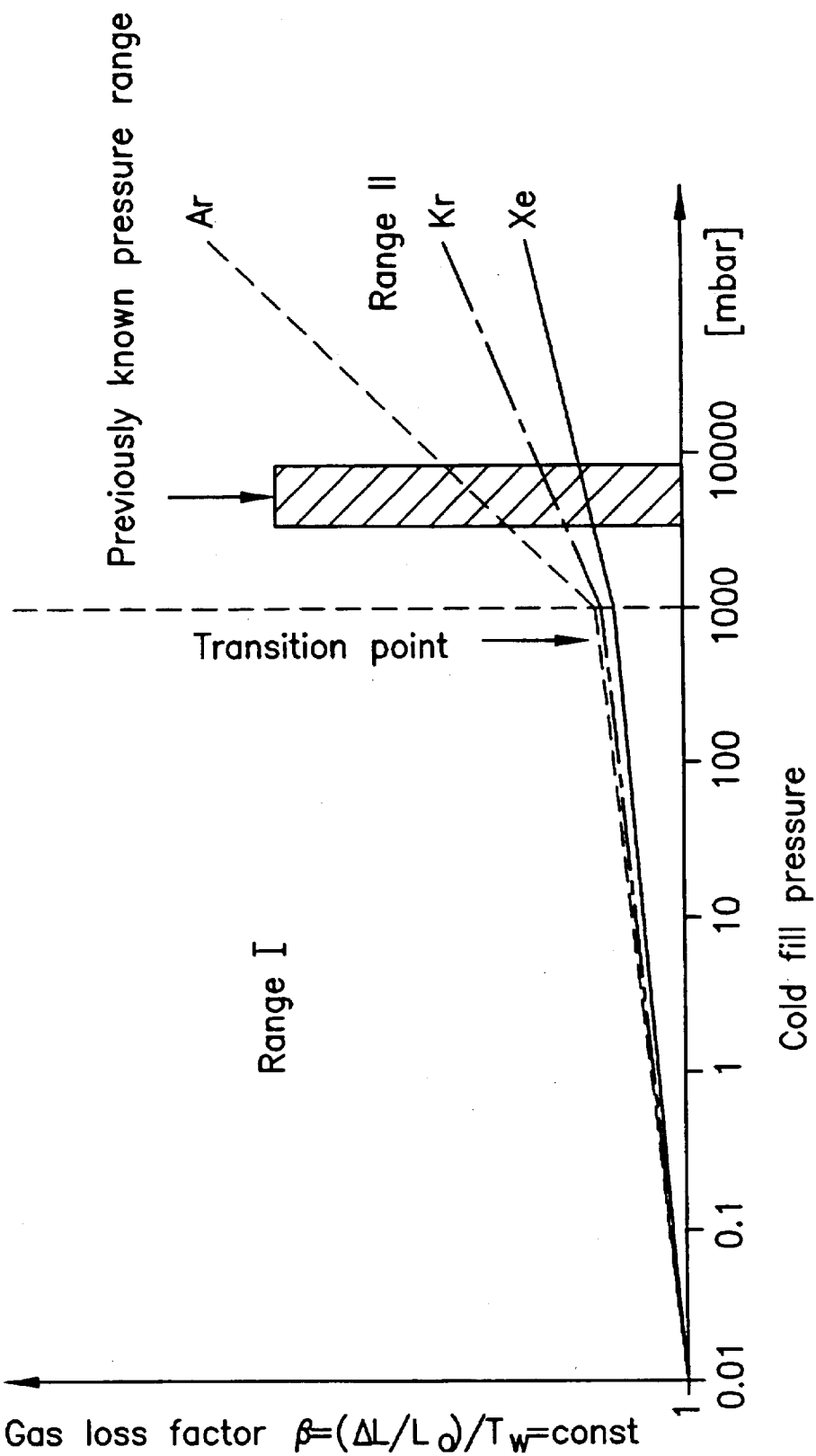
Figure 6:
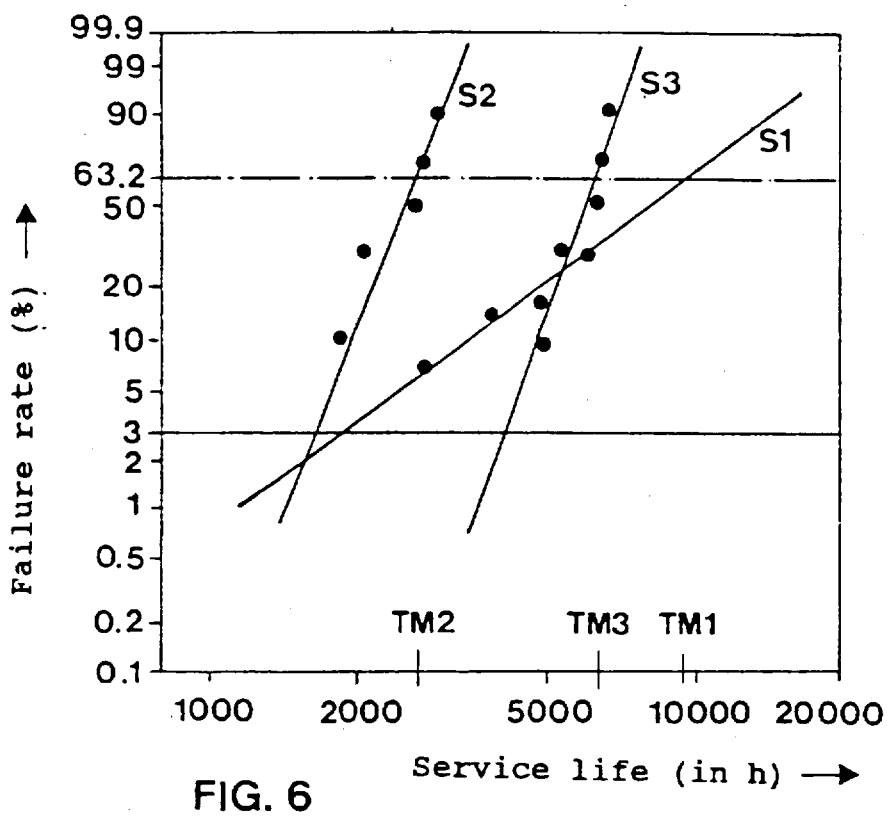
Figure 7:
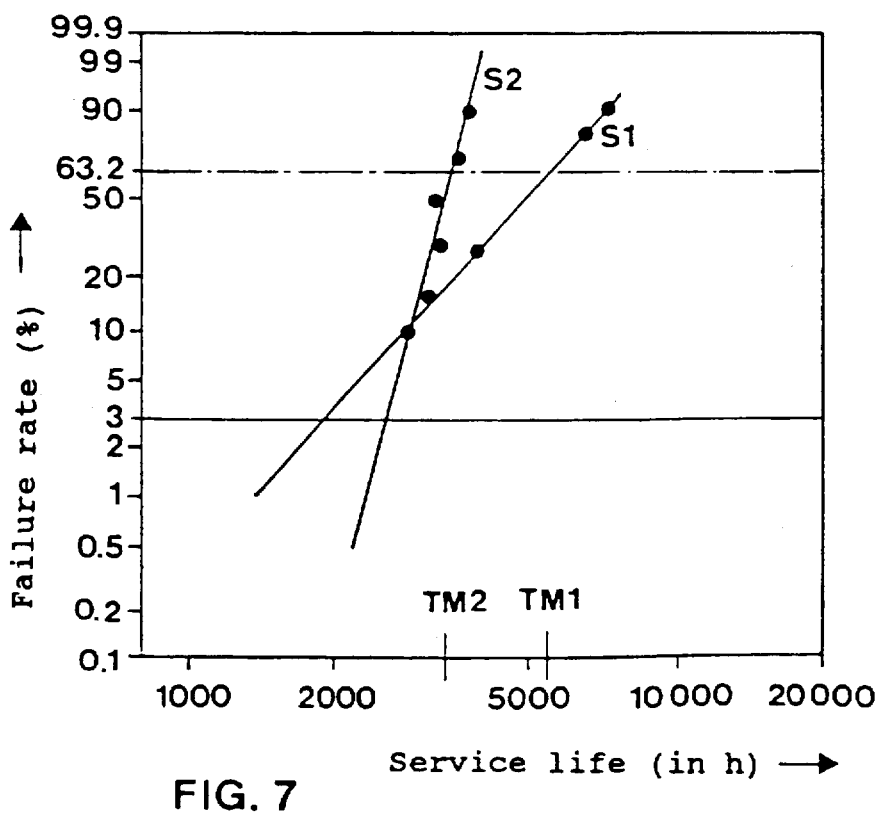
Figure 8:
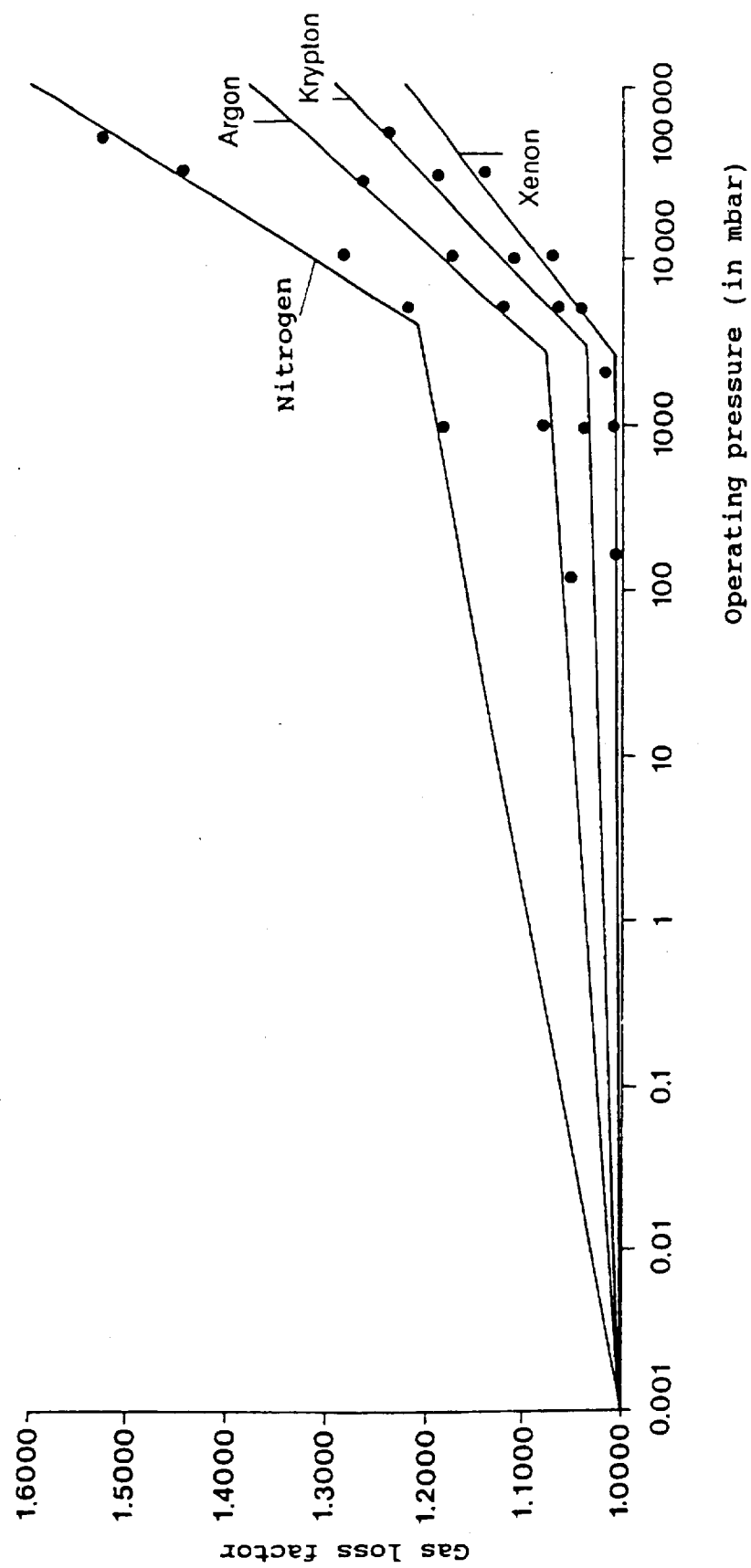
Figure 9:
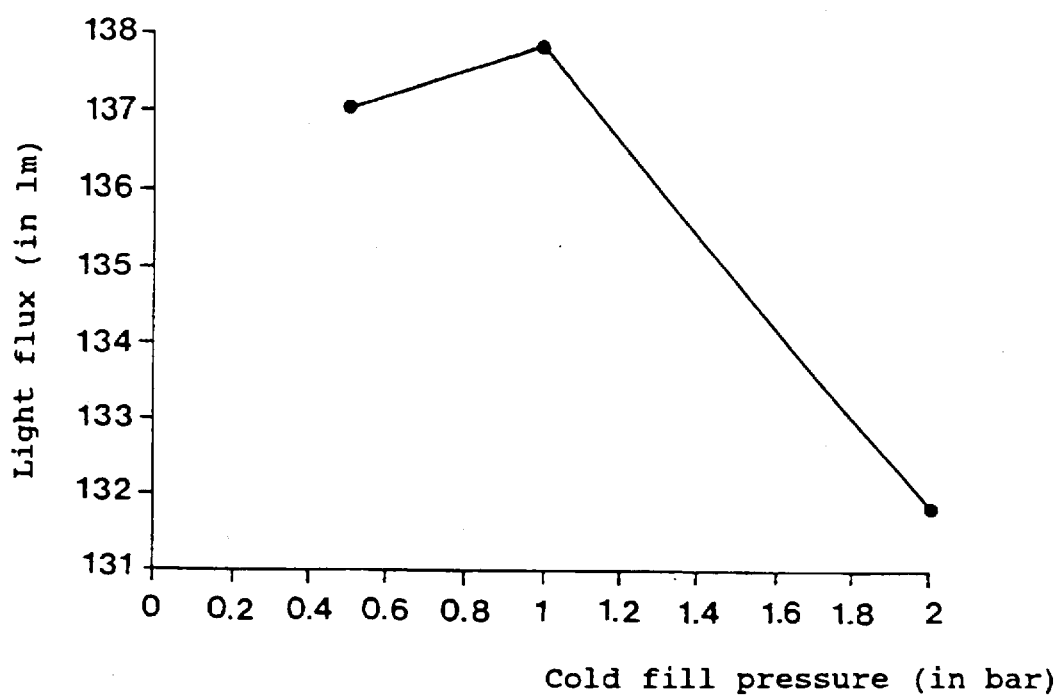
Figure 10:
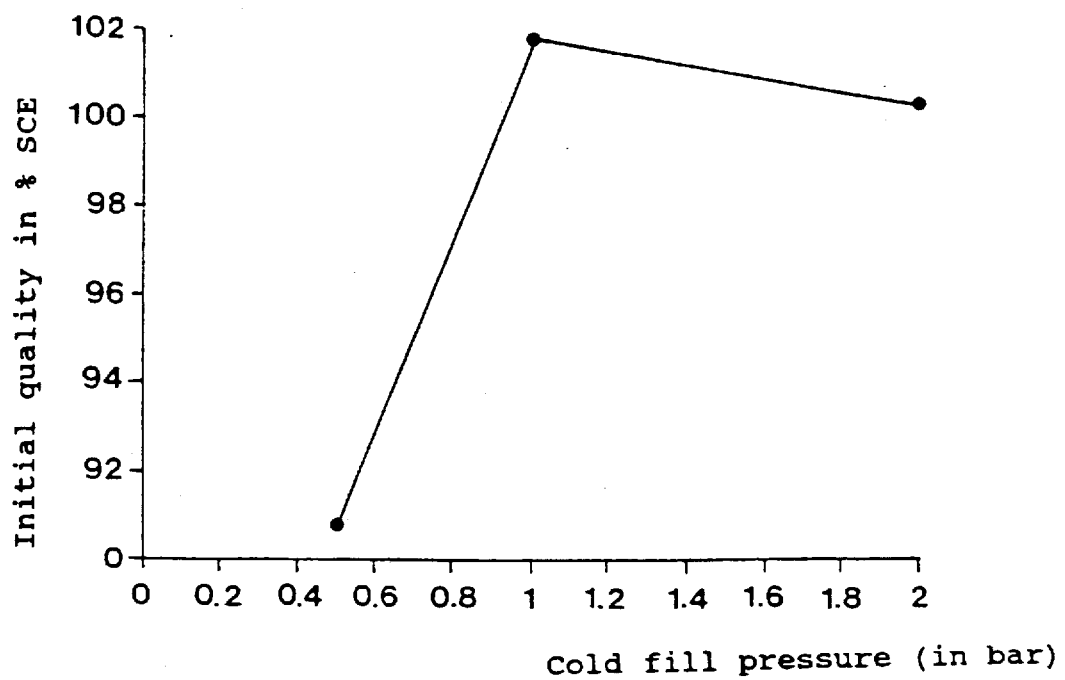
Figure 11B:
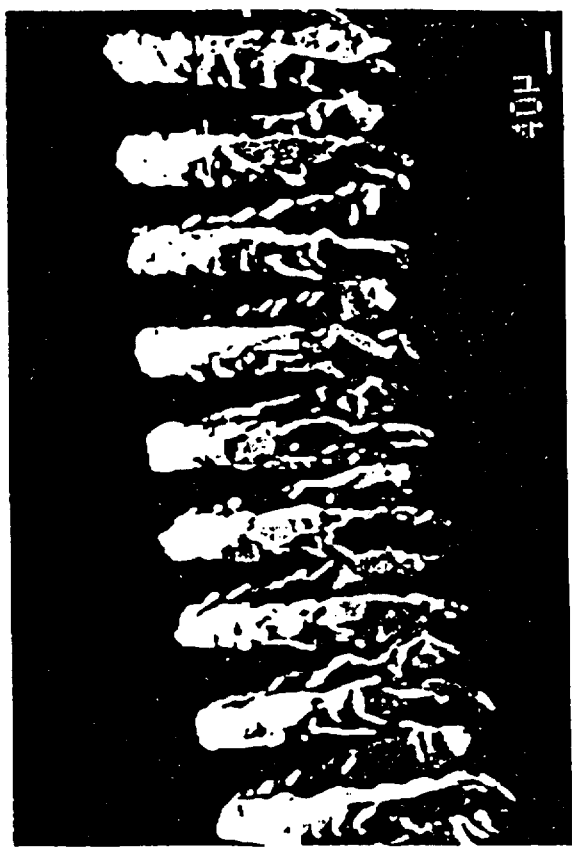
Figure 11A:
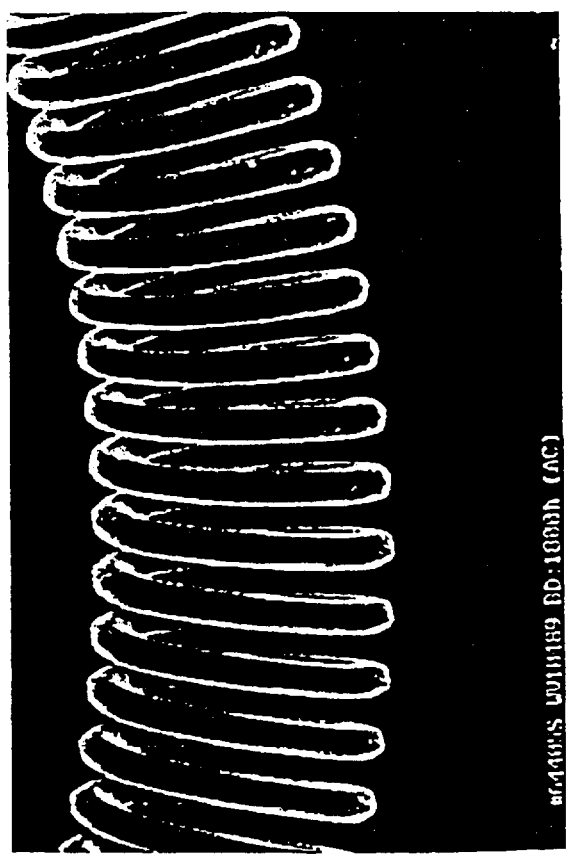
Figure 12:
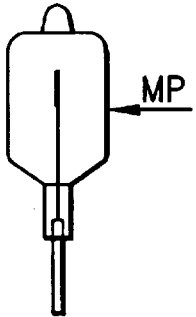
Figure 12:
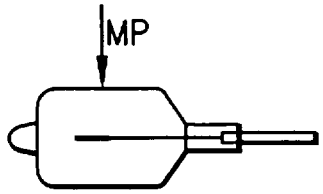
Figure 12:
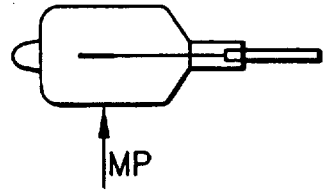
Figure 12:
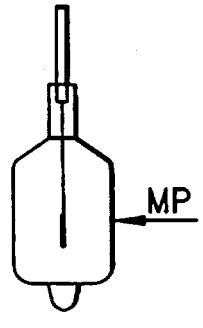
Figure 13:
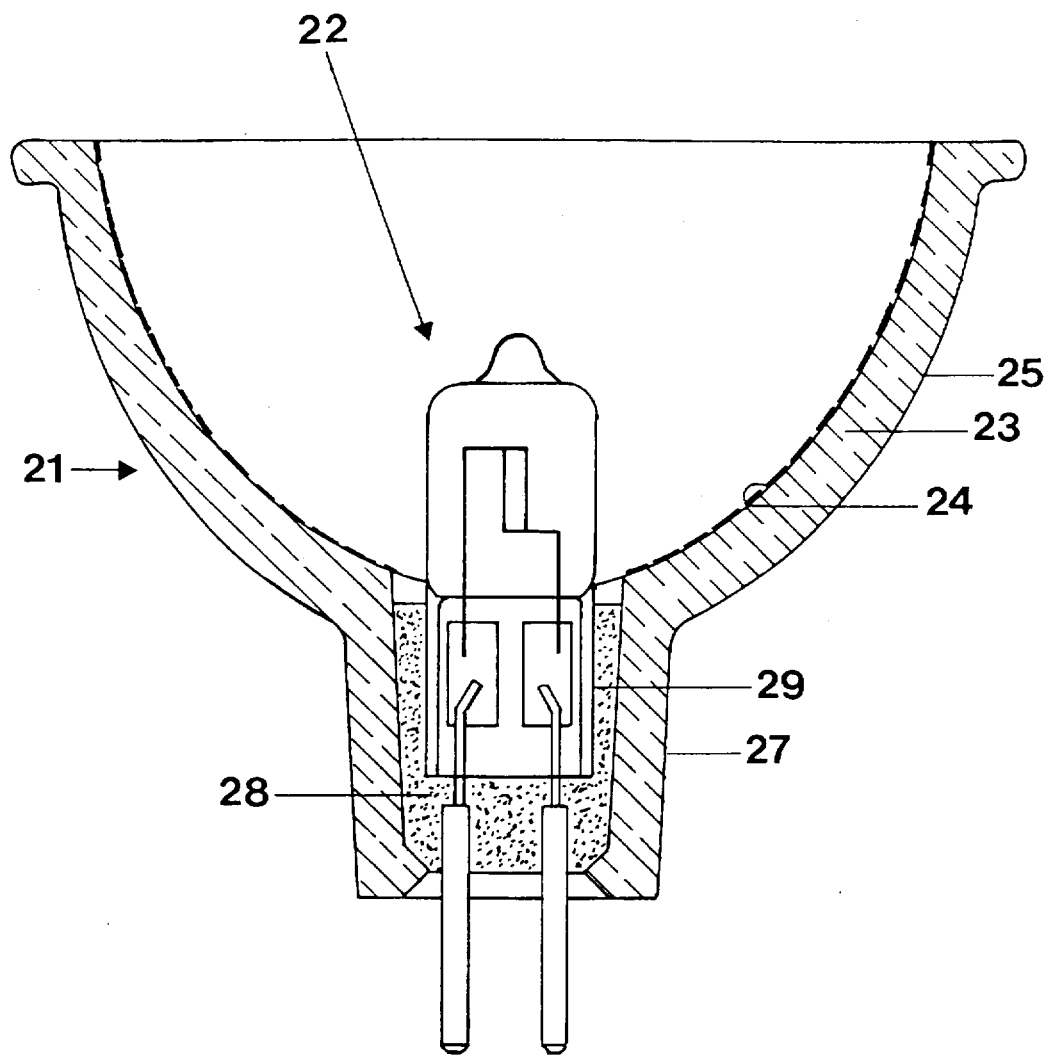
Figure 14:
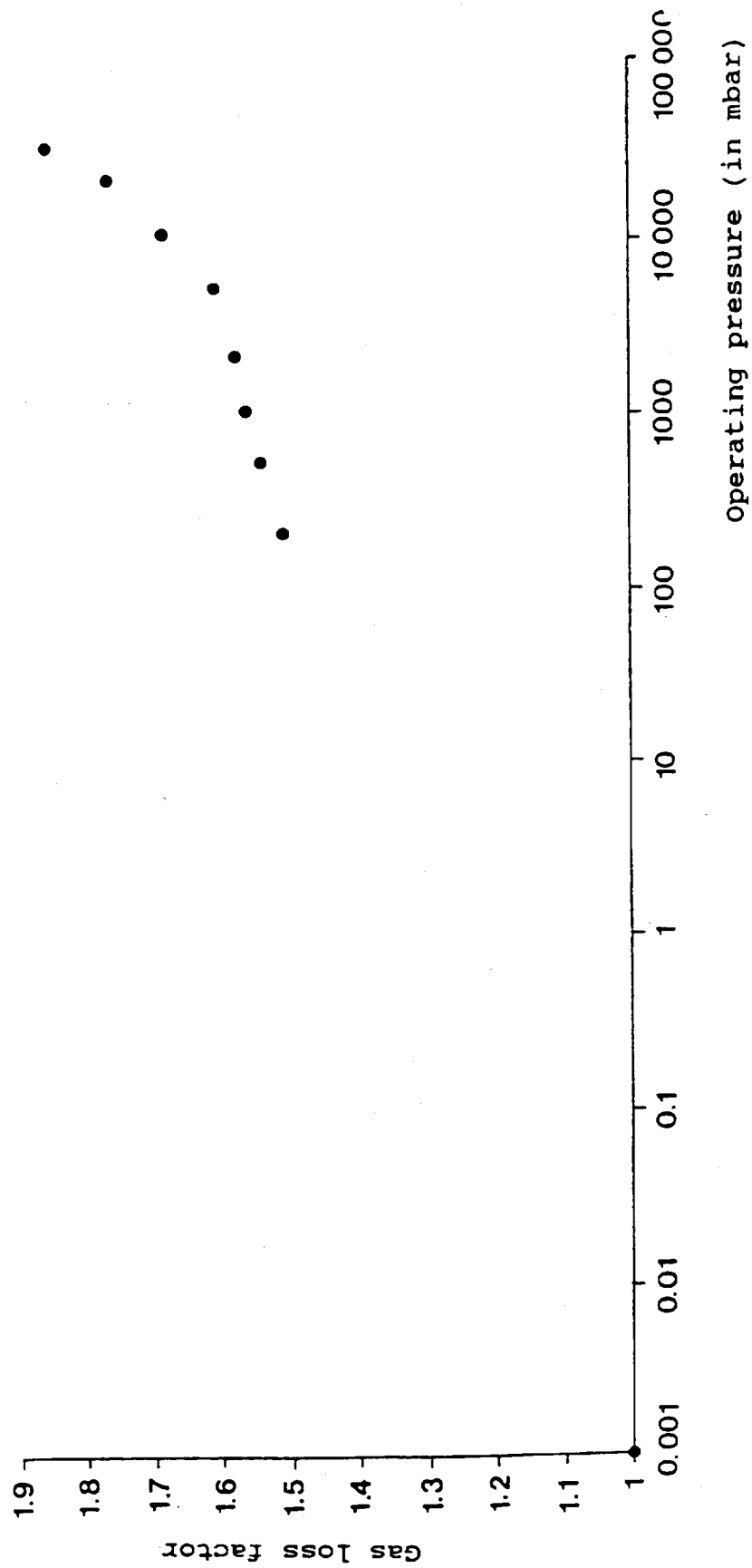
Figure 15:
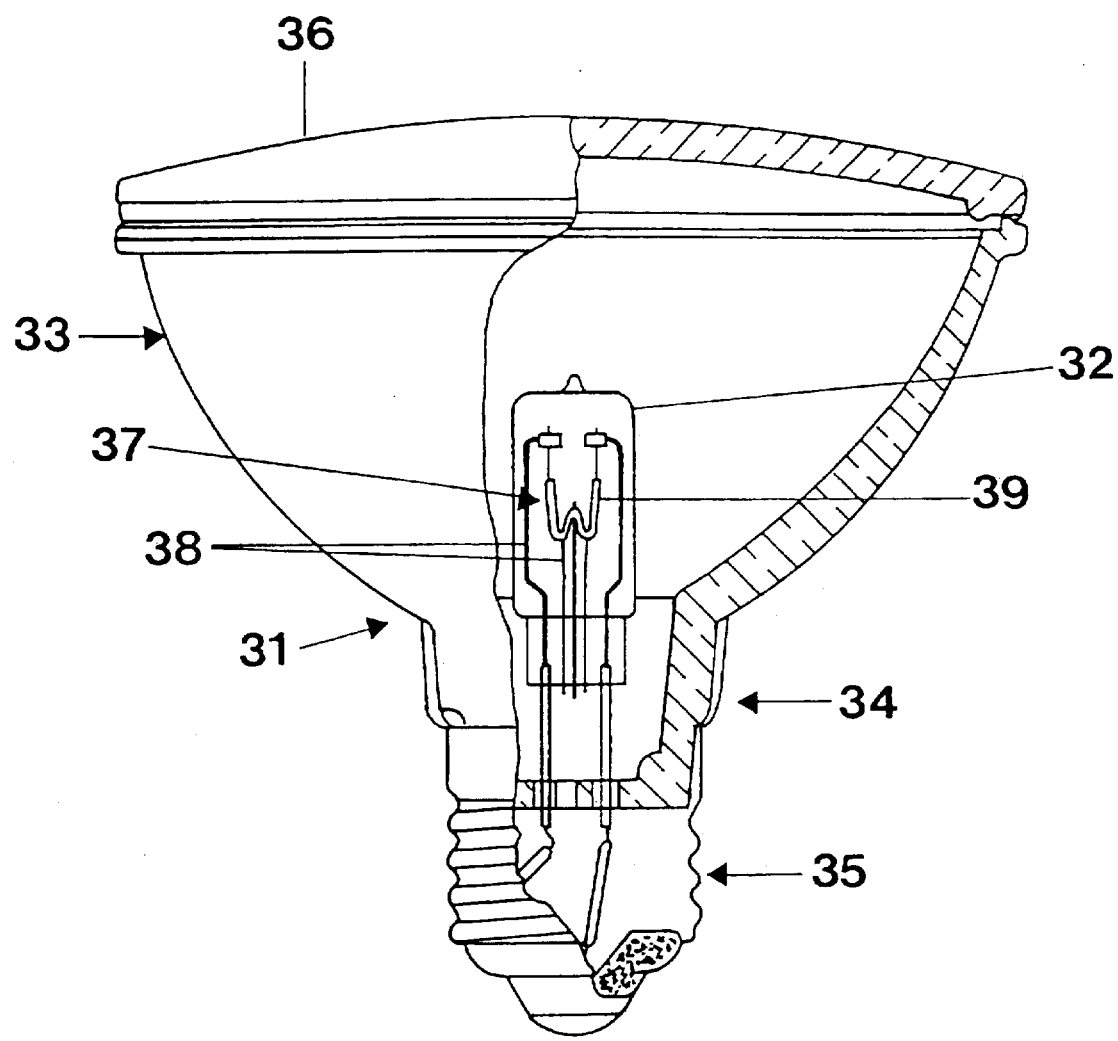
Figure 16:
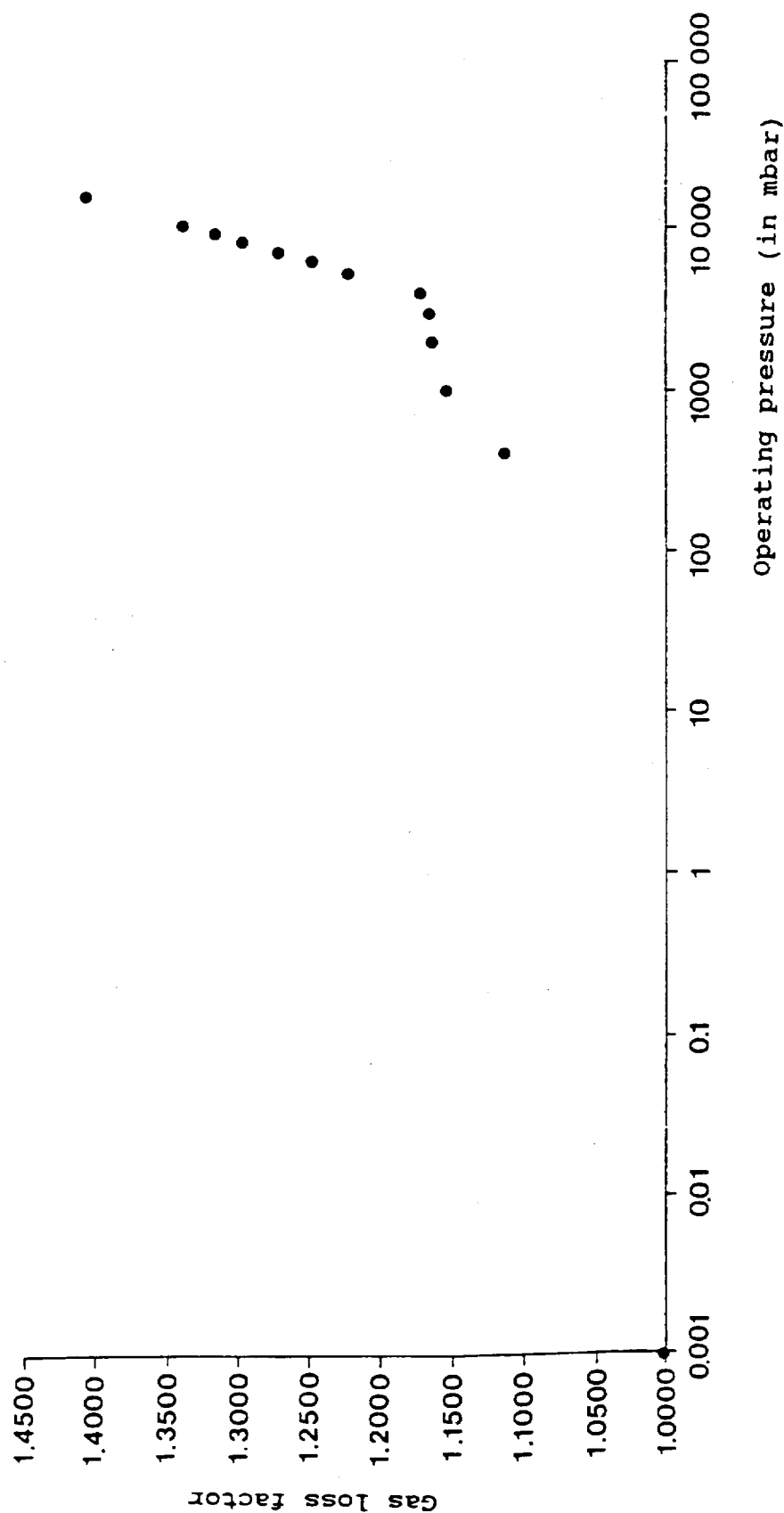
Figure 17:
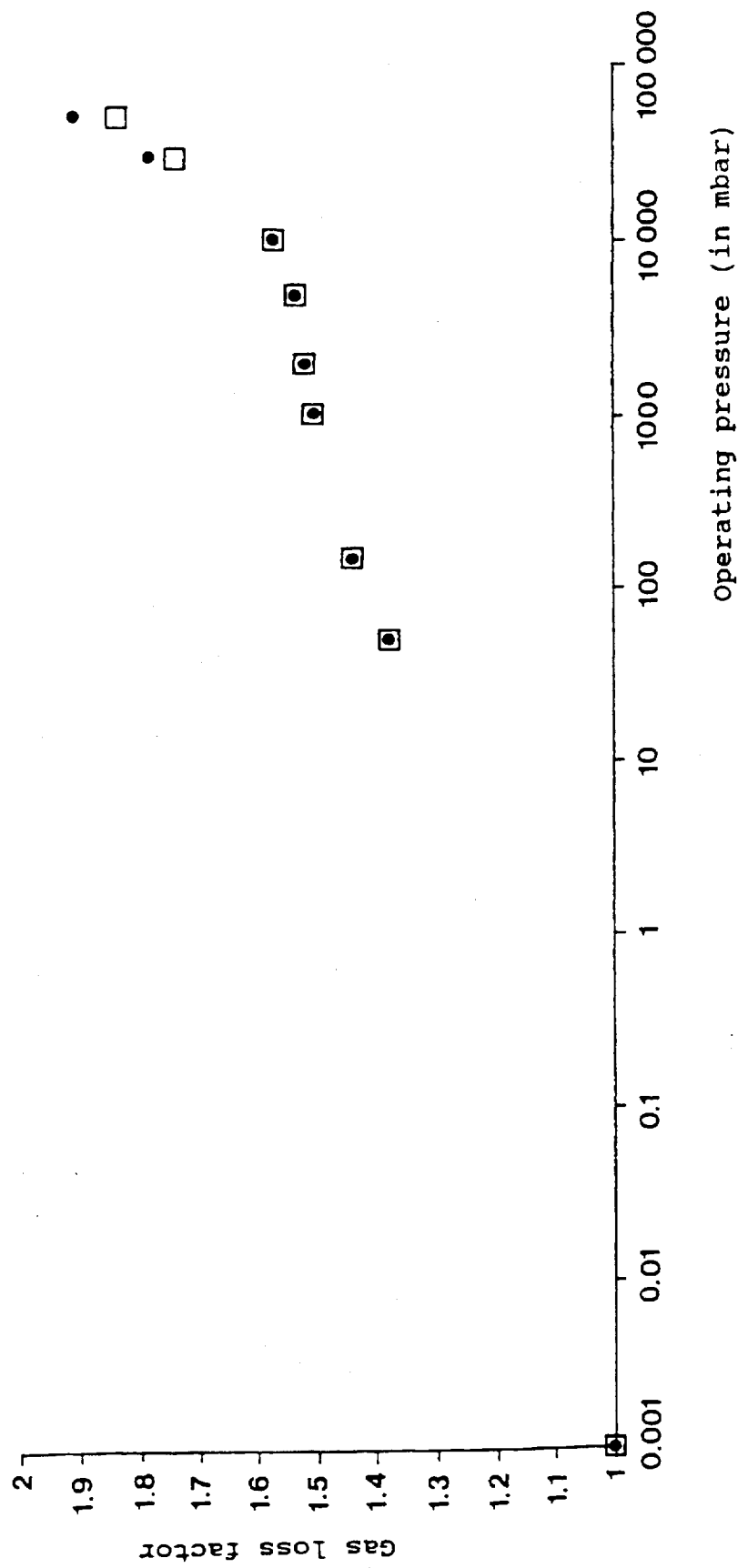
Figure 18:
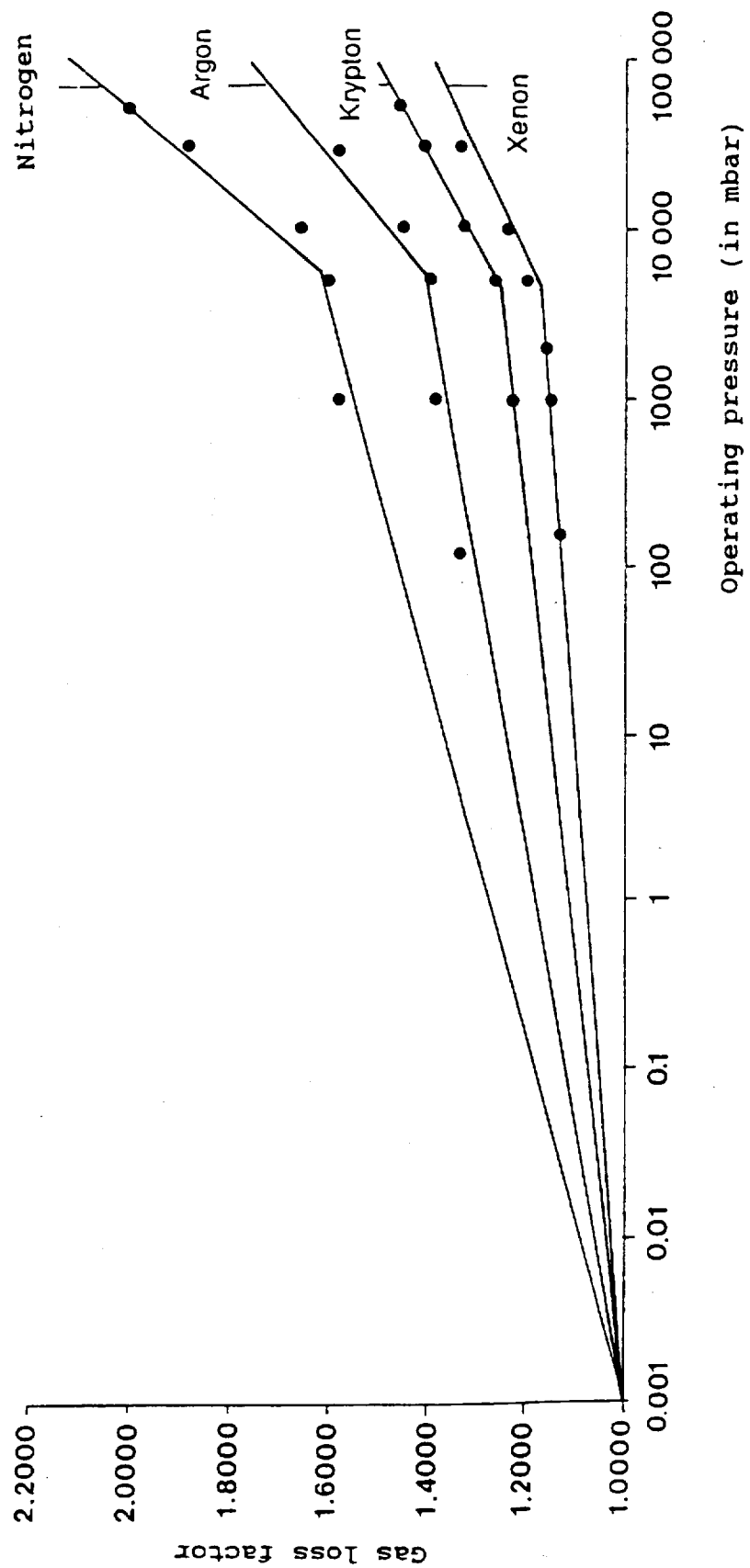
Figure 19:
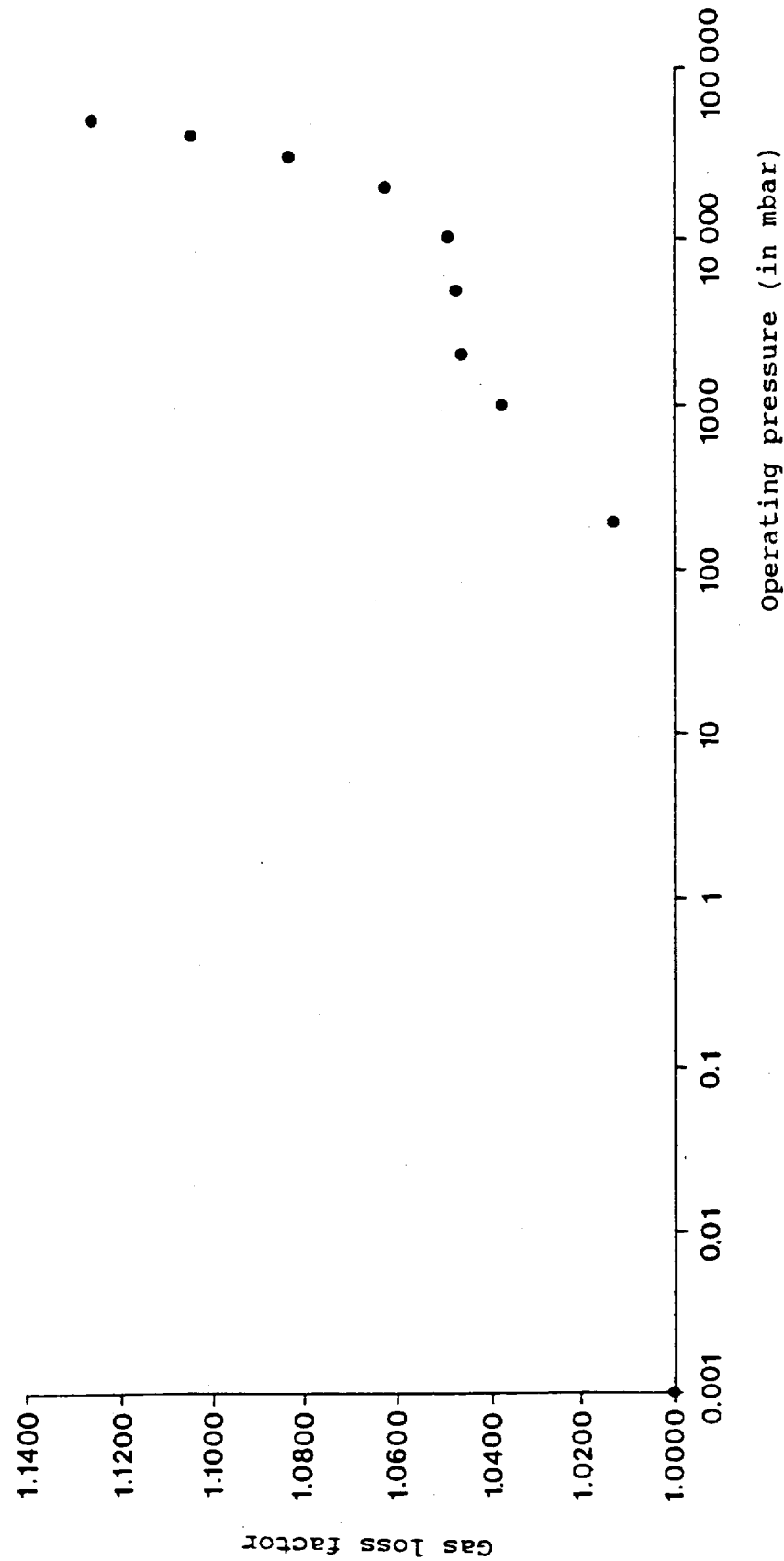

The invention will be described below in terms of several exemplary embodiments. Shown are:

FIG. 1, an incandescent halogen lamp with an axially located luminous element;

FIG. 2, an incandescent halogen lamp with a transversely located luminous element;

FIG. 3, the fill gas power losses as a function of the cold fill pressure;

FIG. 4, the rate of evaporation loss of tungsten (Fig. a) and the power loss as a function of the cold fill pressure;

FIG. 5, two Weibull distributions (frequency of failure as a function of the service life);

FIGS. 6 and 7, the failure characteristic (slope of the Weibull distribution) as a function of the service life;

FIGS. 8–10, measurements of various operating variables;

FIG. 11a, an illustration of a coil according to the invention; and a coil according to the prior art;

FIG. 11b, an illustration of a coil according to the prior art;

FIG. 12, an overview of a mounting position;

FIG. 13, a low-voltage reflector lamp;

FIG. 14, the measurement of the gas loss factor of a lamp of FIG. 13;

FIG. 15, a high-voltage reflector lamp;

FIG. 16, the measurement of the gas loss factor of a lamp of FIG. 15;

FIGS. 17–19, measurements of the gas loss factor in various tubular lamps.

In FIG. 1, an incandescent halogen lamp with a rated voltage of 6 V and a power of 10 W is shown. It comprises a bulb 1, pinched on one end, which is shaped as a cylinder with an outer diameter of approximately 7.0 mm (previously 8.2 mm) and a wall thickness of approximately 0.8 mm (previously 1.2 mm). It is closed with a pinch 2 and has a pump tip on the opposite end from the pinch. The bulb is made of quartz glass. The fill comprises 1000 mbar of xenon (or krypton) with an addition of 1800 ppm of iodine ethane ($C_2H_5I$) (in another exemplary embodiment, the halogen addition comprises 400 ppm of dibromomethane) for a lamp volume of 0.15 (previously 0.22) $cm^3$. A cylindrical light emittins, or luminous element 6 whose dimensions are 2.4 mm in length and 0.9 mm in diameter is located axially in the bulb interior. It is retained by two power supply leads 3, which are joined with foils 4 in the pinch 2, and the foils 4 are in turn connected to external base prongs 5.

The filament which forms the luminous element is manufactured from tungsten wire having a diameter of 104 µm with an effective total length of 32 mm, so that its total surface area is approximately 10.0 $mm^2$. The power supply leads are formed directly by the coiled wire.

The luminous element comprises 12 windings with a pitch of 188 µm, corresponding to a pitch factor of 1.8. The core diameter is approximately 730 µm, corresponding to a core factor of 7.0. The service life is more than 5000 hours at a color temperature of 2500K, a light flux of 110 lm, and a light yield of 10.5 lm/W.

A second exemplary embodiment is a 12 V/5 W incandescent halogen lamp, which is shown in FIG. 2. The cylindrical hard glass bulb 1, with an outer diameter of about 9 mm and a wall thickness of 1.15 mm, contains as its fill xenon with a cold fill pressure of about 1000 mbar and a halogen additive of 3000 ppm $CH_2clI$. The lamp volume is 0.32 $cm^3$. A singly coiled luminous element 6' is located approximately transversely to the lamp axis in the bulb interior; its originally cylindrical shape has been bent into approximately an annular segment. It is retained by two separate pronglike power supply leads 3'. Otherwise, the structure of the lamp is similar to that of the first exemplary embodiment.

The luminous element is made of tungsten wire with a diameter of 41 µm and an effective total length of 48 mm. The coil surface area is approximately 5.7 $mm^2$. Originally, the luminous element comprises a singly coiled cylindrical body with the following dimensions: length, 3.9 mm; diameter, 0.32 mm. It contains 54 windings with a pitch of 75 µm and a pitch factor of 1.8. The core diameter is 240 µm, corresponding to a core factor of 5.7. The service life is 3100 hours at a color temperature of 2625K and a light yield of 12 lm/W, derived from a light flux of 63 lm.

A third exemplary embodiment is a 12 V/10 W lamp, which substantially corresponds to the second exemplary embodiment and is therefore also represented by FIG. 2. Unlike the second exemplary embodiment, a tungsten wire of 65 µm in diameter is used, which is originally coiled into a cylinder whose dimensions are 4.2 mm in length and 0.58 mm in diameter. The total length is 58 mm, so that the wire surface area is approximately 11.8 $mm^2$. The pitch factor is 1.75, corresponding to a pitch of 115 µm. The core factor is 6.9, corresponding to a core diameter of 450 µm. The number of windings is 36. The service life is approximately 3100 hours at a color temperature of 2700K, a light flux of 140 lm, and a light yield of 14 lm/W. A comparison with the previously known high-pressure version is shown in table 3.

A fourth exemplary embodiment is a 12 V/20 W incandescent halogen lamp, which substantially corresponds to the first exemplary embodiment. The fill comprises 1000 mbar of xenon or krypton with 3000 ppm of iodine ethane.

The luminous element has 22 windings and its pitch is 167 µm, for a pitch factor of 1.65; the core diameter is 737 µm for a core factor of 7.2; the color temperature is 2700K; the light flux is 320 lm and the light yield is 15.4 lm/W. In this lamp, when a bulb 8 mm in diameter is used, the mean bulb temperature drops from 360° C. to 310° C., so that the use of a 7 mm bulb at a mean bulb temperature of 335° C. has become possible.

Table 1 hereinafter shows a comparison of the operating data of the above first four exemplary embodiments, compared with values that are referred to lamps without the properties according to the invention, or in other words in particular without convection.

At a rated service life of 2000 hours each, the deviation (variance) in the mean service life and the residual light flux at 75% of the rated service life are shown. In all lamp types operated convection-free, a drastically reduced variance in the service life is exhibited. This reduced variance is a direct consequence of the halogen cycle process that has been reduced to the absolute minimum necessary. No less impressive is the fact that the residual light flux practically remains virtually constant for 75% of the rated service life, which can be ascribed to the elimination of the faceting effect.

An additional table, Table 2, for the same lamp types, shows how the light flux (expressed in lumens) can be varied on the basis of the invention. Column 1 shows the lamp type and column 2 the light flux when a high pressure involving convection is used (approximately 8 bar of krypton or 13.3 bar of xenon in the prior art); column 3 shows the reduction in light flux that can be expected in the prior art if the fill pressure is lowered to approximately 1 bar. Column 4 shows the gain in light flux compared with column 3 resulting from the purposeful use of the means according to the invention (optimization of the lamp for convection-free operation by means of optimizing the bulb and the luminous element and by means of fill gas parameters) while preserving the same rated service life.

It can be seen that a drop in the light flux of the high-pressure version (column 2) of between 20 and 33% (column 3) is expected as a result of the fill pressure reduction. As a result of the invention, these losses can largely be contained and sometimes even entirely compensated for (column 4). A breakthrough in the positive sense has thus been achieved for the first time with respect to the relationship among fill pressure, service life and light flux that is familiar to anyone skilled in the art; particularly the drastically reduced variance in the lamps of the invention plays a major role.

FIG. 3 shows a schematic illustration of the loss factor $\beta$, or in other words of the power loss $\Delta L$ from heat dissipation as a function of the fill pressure (p), on the assumption of a constant coil temperature $T_w$, and hence a constant light flux, standardized for lamp power $L_o$ in a vacuum. The pressure is plotted (in millibar) logarithmically on the abscissa. The lamps according to the invention all have this basic pattern; depending on lamp type, the break in the curve (transition from range I of pure heat conduction through diffusion at low pressures, for instance below about 1 bar, to range II, in which convective heat conduction predominates) may be at some different value for the cold fill pressure. Typically, it fluctuates between 0.1 and 2 bar for low-voltage lamps; in high-voltage lamps (and occasionally in low-voltage lamps as well), however, higher values (such as 5 bar) can also be found. The preferred operating range according to the invention is just below the transition point.

In FIG. 3, this is indicated by an arrow. Moreover, the usual pressure range for incandescent halogen lamps (5 to 10 bar) is designated by shading. A striking feature of this graph is that the basic behavior in range I is virtually independent of the fill gas, while the convection-impinged losses in range II depend strongly on the fill gas. The heavier the fill gas, the slighter the losses—which agrees with the known teaching meant for range II. The ratios for the noble gases argon, krypton and xenon are given as examples.

Often a possibly heavy fill gas, such as krypton or xenon, is preferable in lamps according to the invention, because under otherwise identical conditions it better prevents the evaporation of the tungsten material.

It is a further advantage of the present invention is that because of the low fill pressure, considerable cost savings for the fill gas (xenon) become possible. Limiting the losses to the pure heat conduction phenomenon also makes it understandable why the attainable improvements are especially pronounced in luminous bodies, which are made of thin, long wires and thus have a relatively large coil surface area. This is because the larger the coil surface area, the greater are the attendant heat losses.

Figure 4A:
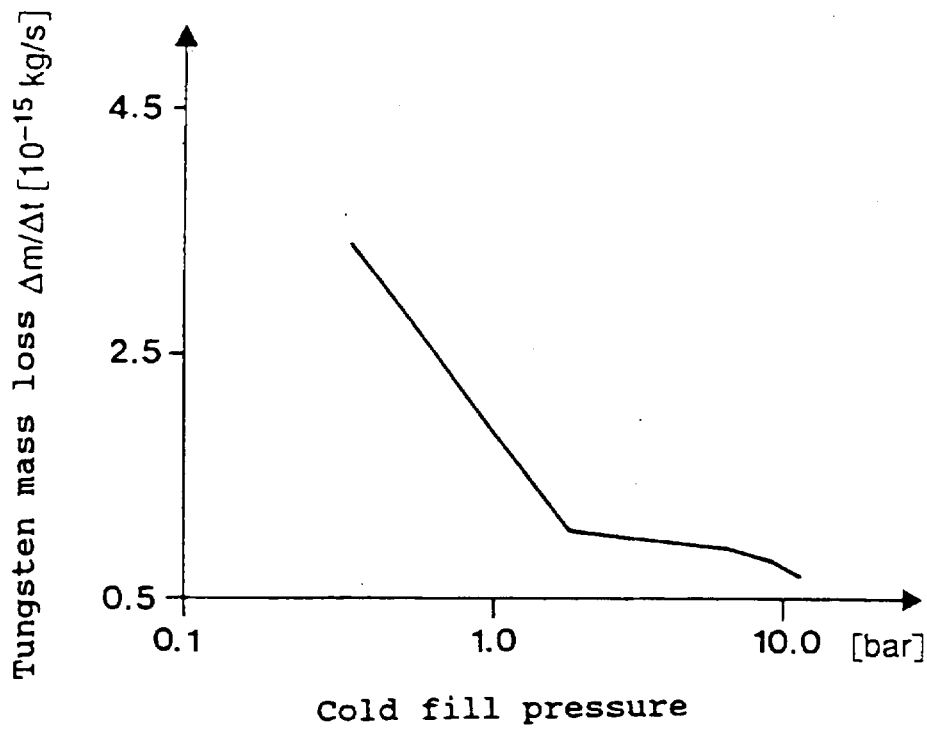

In FIG. 4a, to further illustrate the situation, the tungsten loss per unit of time ($\Delta m/\Delta t$) is calculated as a function of the fill pressure for a model lamp. It is especially strongly pronounced at low pressures, below approximately 1 to 2 bar, and above that decreases only slightly. This behavior justifies the choice of a relatively slight fill pressure of about 1 bar, since the still-attainable improvement at high pressures is slight compared with the situation at very low pressures.

Figure 4B:
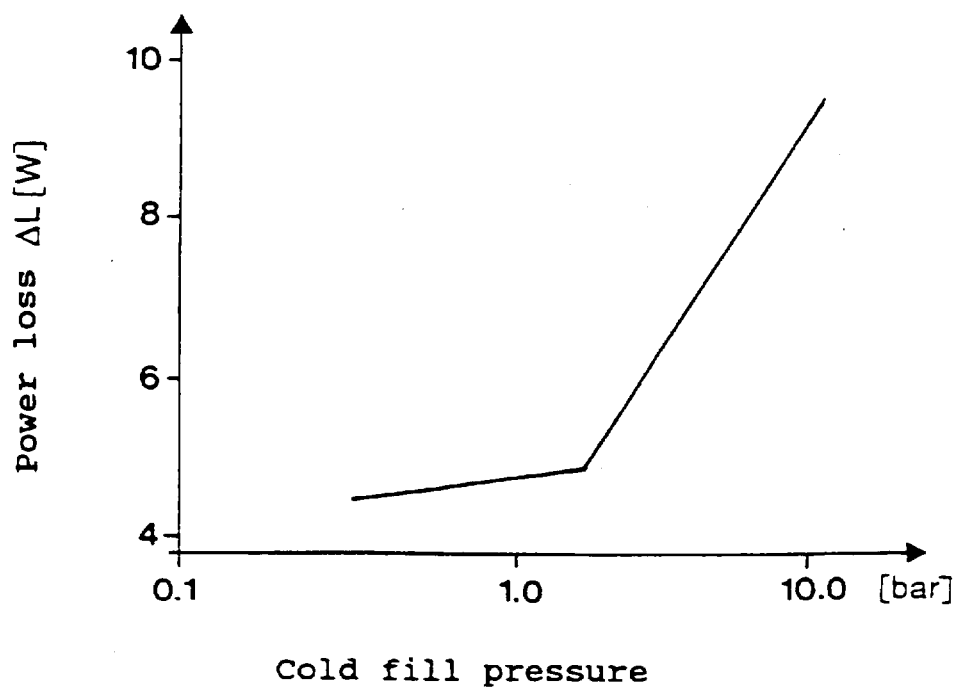

In FIG. 4b, the relationship illustrated in FIG. 3 is shown again for this model lamp, but without standardization to the power attained in a vacuum but instead in the form of an absolute value for the power losses.

Figure 5A:
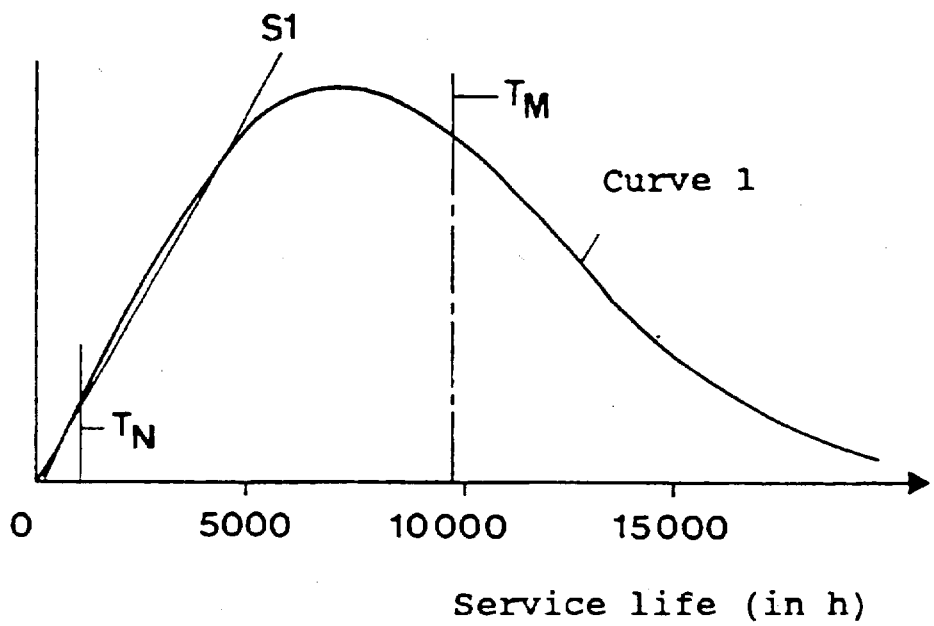
Figure 5B:
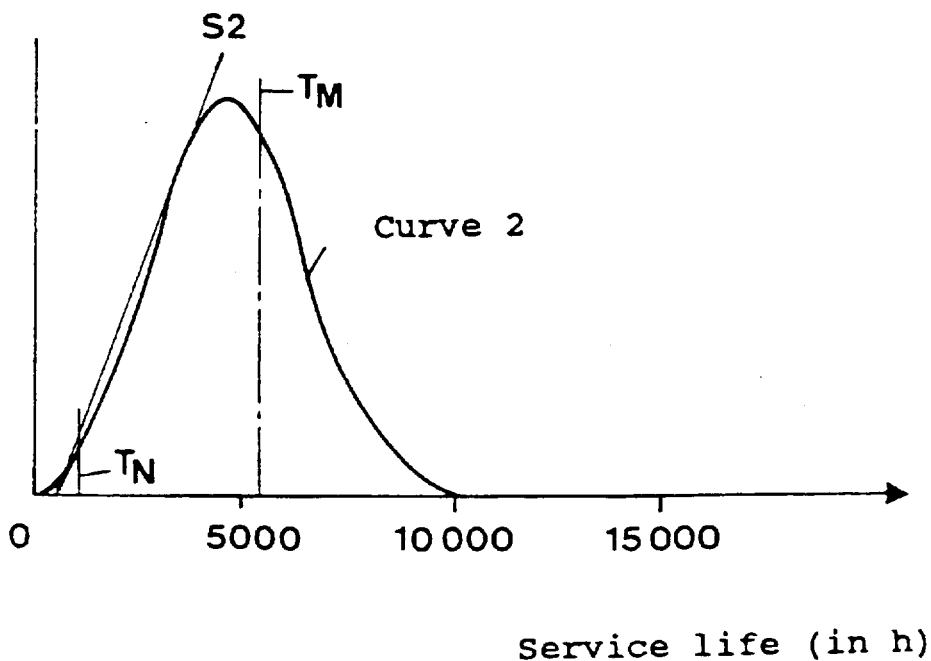

A look at FIGS. 4a and 4b together shows that it is quite possible, in the sense of a mathematical convolution, to consider attaining long service lives even at relatively slight pressures of about 1 bar, in other words by operating at the upper limit of the convection-free pressure range. At the transition point, both the pressure dependency of the power loss and that of the tungsten mass loss change abruptly. In FIG. 5, to illustrate the significance of the different variances, two Weibull distributions are shown as an example, with the same rated service life $T_N$ of 2000 hours (defined by the first 3% of failures in a set of lamps). A first distribution (FIG. 5a) along the lines of the prior art shows wide variance (curve 1); the mean service life $T_M$ is about 9000 hours. The second distribution (FIG. 5b), using the technology of the invention (curve 2), discloses a substantially shorter mean service life $T_M$ of 5100 hours, but because of the narrow variance it suffices to attain the same rated service life $T_N$ of 2000 hours.

A striking measure of this subject matter is the slope (shown in dashed lines) of the rising (left-hand) branch of the Weibull distribution. According to the invention, it is much steeper (S2) than in previously known lamps (S1). A comparison of these slope values is shown in FIGS. 6 and 7, respectively, for lamps of the 12 V/5 W and 12 V/10 W type.

A 12 V/5 W lamp with a previously known high-pressure fill (FIG. 6, curve S1) attains a 3% failure rate of approximately 1900 hours; the mean service life $T_{M1}$ (corresponding to a 63.2% failure rate) is not reached until not quite 10,000 hours. A light yield of 12.0 lm/W is measured. The freedom of design in the invention is represented by two versions. In a first version (curve S2), by means of a low-pressure fill according to the invention, which is optimized by varying the coil data for light yield, an even higher light yield (12.4 lm/W) is attained, at almost the same rated service life (1700 hours). The mean service life $T_{M2}$ is approximately 2500 hours.

In a second version (curve S3) of the low-pressure lamp, which is optimized for service life (mean service life $T_{M3}$ of 6500 hours, the light yield is somewhat less (10.9 lm/W), but the rated service (4000 hours) is more than twice as long.

FIG. 7 shows a similar relationship for a 12 V/10 W lamp. The previous high-pressure version with a rated service life of 1900 hours (curve S1) and a mean service life ($T_{M1}$) of 5500 hours attains a light yield of 14.1 lm/W. By comparison, a lamp of this type according to the invention, at a light yield of 13 lm/W, attains a markedly longer rated service life of 2500 hours, with a mean service life $T_{M2}$ of 3400 hours (this is the version optimized in terms of service life).

This accordingly demonstrates the fact not only that it is now possible to furnish incandescent halogen lamps with a low cold fill pressure, on the order of magnitude of 1 bar, which (virtually) without sacrifices of light yield attain the same rated service life as lamps with a considerable overpressure (approximately 8 to 13 bar), but also that there is a potential for optimization in various directions.

The unexpectedly slight sacrifices of light yield are offset by the following decisive advantages: the elimination of the risk of bursting, and economies of material and fill gas.

Further exemplary embodiments are low-voltage lamps (12 V) with relatively high power (20 W, 35 W, 50 W), in which light yields of 15.2 lm/W, 17 lm/W, and 18 lm/W are attained. The cold fill pressure was approximately 800 mbar. Purely in terms of calculation, according to the teaching prevailing until now, light yields of 13.5 lm/W (for 20 W), 14.6 lm/W (for 35 W) and 15.2 lm/W (for 50 W) would have been expected.

The grain boundary corrosion, which is suppressed according to the invention, is especially impressive. While a 12 V/5 W lamp filled with 1 bar of xenon and operated convection-free exhibits practically no damage after 1800 hours in operation (FIG. 11a), the coil of a convection-impinged comparison lamp (13 bar of xenon), after the same time in operation, is already severely affected (FIG. 11b).

TABLE 1

| Lamp type | Prior art | | Per invention | |
| --- | --- | --- | --- | --- |
| | Variance (relative standard deviation) | Residual light flux at 75% of rated service life | Variance (relative standard deviation) | Residual light flux at 75% of rated service life |
| 12 V 5 W | 0.35 | 83% | 0.076 | 96% |
| 6 V 10 W | 0.3 | 95% | 0.11 | 100% |
| 12 V 10 W | 0.35 | 90% | 0.112 | 96% |
| 12 V 20 V | 0.3 | 90% | 0.18 | 100% |

TABLE 2

| Lamp type | Light flux (lm) per prior art | Light flux reduction (lm) from fill level reduction | Light flux gain (lm) from optimization per invention |
| --- | --- | --- | --- |
| 12 V 5 W | 60 | −20 | +20 |
| 6 V 10 W | 120 | −35 | +25 |
| 12 V 10 W | 140 | −40 | +40 |
| 12 V 20 W | 350 | −70 | +40 |

The preferred choice of the "operating point" just below the transition point (see FIG. 3) will be explained for example in terms of the aforementioned 12 V/10 W lamp. Here, the transition point is fairly precisely at 1 bar of cold fill pressure, corresponding to an operating pressure of approximately 3 bar (FIG. 8). The drop in light flux from the heat dissipation has been studied in the critical range (FIG. 9). It is found that at a cold fill pressure of 0.5 and 1 bar, the light flux remains virtually constant, since the heat losses are very slight (FIG. 3, range I) and increase only slightly. Upon a further increase to 2 bar of cold fill pressure (corresponding to an operating pressure of about 6 bar), the light flux drops markedly, in agreement with the heat dissipation that sharply increases in the convective range (range II of FIG. 3).

On the other hand, FIG. 10 illustrates an investigation of the initial quality (expressed in % SCE); the SCE value describes the light yield of a lamp of equal current whose light yield has been standardized for comparison to a 1,000 hour service. The higher the initial quality in percent SCE, the greater the advantage in terms of the light yield (for a constant service life) or in the service life (for a constant light yield) when the lamps are compared with one another. It can be seen that upon an increase in the xenon cold fill pressure from 0.5 to 1 bar, a marked increase in the initial quality can be attained. Conversely, in the convective range (at 2.0 bar of cold fill pressure), no increase (and in other cases no significant increase) in the initial quality is possible any longer. The explanation can be said to reside in the pronounced dependency of the service life on the fill pressure below the transition point, while above the transition point the theoretically longer service life is rendered invalid in practice because of its great variance, caused by the loss mechanisms discussed above.

Particular advantages are exhibited by lamps according to the invention in conjunction with reflectors or light fixtures, because of their reduced temperature strain.

FIG. 12 shows measurements of the bulb temperature (MP stands for measurement point) in °C., in comparison with a 12 V/10 W lamp of the prior art (column 2) and a lamp of the invention (column 3). The mounting location is shown in the first column in each case. A greatly improved isothermia is exhibited, because the variance for a different mounting position drops sharply. In the invention, it is 55° C., compared with 120° C. in the prior art. Moreover, the absolute temperature strain also drops. The maximum value drops from 315° to 240° C., and the minimum value remains at about 10° C.

A reflector lamp of this kind, using a cold light reflector 21 known per se, is shown in FIG. 13. The cold light reflector 21 comprises an ellipsoidal glass dome or bowl 23 with a formed-on reflector neck 27. An interference filter 24, known per se, is applied to the inside of the glass dome 23; it has a high degree of reflection over the entire visible spectral range and is transparent to infrared radiation. The light source is a 12 V/10 W incandescent halogen lamp 22, whose pinch is fixed in the reflector neck 27 with the aid of cement 28. The light outlet opening of the cold light reflector 21 has a diameter of about 48 mm. Because of the low fill pressure of the lamp (see above), it is possible to dispense with a glass disk to cover the opening. In this reflector lamp, which has a coiled coil, the temperature at the pinch drops from 350° C. (in the earlier high-pressure version) to 320° C., if the lamp is operated convection-free.

Table 3 shows a summary of essential comparison data of 12 V/5 W and 12 V/10 lamps, each in a high- and low-pressure version with the same light yield. A point especially to be considered is the different radiant coil surface area and the different wire diameter for the luminous element. The coil temperature (in K) is lower (by 70K) for the lamps of the invention. Accordingly, the color temperature is also markedly lower, which has a favorable effect on the service life. A further factor is a substantially improved mechanical strength, because the wire is approximately 10% thicker.

The present invention is significant not only in the low-voltage range, however, but in the high-voltage range as well. In the final analysis, the fundamental advantages are even more pronounced here. This is because in the high-voltage range (or medium-voltage range), the luminous element wire to be used is thinner and its total length is substantially longer. Such phenomena as the grain boundary corrosion discussed above therefore play a substantial role.

For instance, the above-presented 12 V/50 W incandescent halogen lamp requires a luminous element with a wire diameter of about 120 μm and a total length of 30 mm. In comparison, a similar lamp designed for high voltage (230 V), also with 50 W of power, has a double-coiled luminous element approximately 20 μm in diameter with a total length of about 1 m. Because of this great length, the coil, bent into a W or V, is located in a bulb of 14 mm in diameter pinched on one end.

FIG. 14 shows measurements of the gas loss factor β (see FIG. 3) for the 25 W version of a 230 V incandescent halogen lamp, structurally identical except for the correspondingly modified wire diameter, in a vertical mounting position. Once again, the fundamental dependency on the fill pressure known from the low-voltage range, can be seen. The transition point between the convection-free and the convection-impinged operating state of the lamp is clearly apparent. Surprisingly, this transition point here is markedly higher, at approximately 5 bar of operating pressure, corresponding to a cold fill pressure of approximately 1.9 bar.

An especially important property of the lamps according to the invention, which is expressed clearly especially in the high-voltage versions, is shown in FIGS. 15 and 16. This involves a 230 V/50 W reflector lamp 31, similar to the 25 W lamp just discussed above, which is secured via two long power supply leads in the apex of a pressed glass reflector 33, which by way of example has a diameter of 63 mm (PAR 20) or 95 mm (PAR 30). The reflector has a neck 34, which is secured in a screw base 35. The inner bulb 32, filled with halogen and noble gas, has a luminous element 37 bent into a W, which is retained by five frame wires 38 that are anchored in the pinch. The segments 39 of the luminous element are oriented approximately axially parallel; they are inclined by a maximum of 10° from the reflector axis. The reflector opening is covered by a lens 36.

This lamp, if operated according to the invention, is also distinguished by improved isothermia. Once again, FIG. 16 confirms that the total loss factor β fundamentally depends in the manner according to the invention on the operating pressure (or cold fill pressure). The transition point is at approximately 4 bar. The trend to a transition, not occurring until at a higher pressure, from the convection-free to the convection-impinged mode depends on the generally larger bulb diameters. FIG. 16 is of particular interest, however, for yet another characteristic. It is in fact demonstrated that the linear relationship between the gas loss factor and the logarithmically plotted operating pressure in the convection-free range (see FIG. 3) represents a more or less correct approximation. Depending on individual lamp parameters, a course deviating from this occurs—preferentially in lamps operated with medium and high voltage. At low operating pressures (below 400 mbar), a linear relationship exists, and then a steep rise occurs to approximately 800 mbar. A plateau is reached there, within which the gas loss factor is virtually independent of the fill pressure, until it rises again highly sensitively with the pressure at the transition to the convective mode (at about 4 bar). The reason for this behavior is not yet entirely clear; however, it is probably linked to the ratio between the bulb and luminous element dimensions and the free path length existing in the fill gas.

It has surprisingly been found that the invention is also applicable to tubular lamps, that is, tubular incandescent halogen lamps pinched on both ends. Typical power stages range between 25 and 1000 W. It is especially astonishing that the behavior of these elongated lamps depends relatively little on the mounting position. Especially when bulbs with glass ribs formed of the material of the bulb are used for mounting the luminous element (see U.S. Pat. No. 5,146,134, for instance), which ribs divide the fill volume into individual, loosely bounded portions, the operating behavior is practically independent of the mounting position.

FIG. 17 shows that the gas loss factor of a 120 V/40 W tubular lamp with glass ribs is practically identical in the horizontal mounting position (measurement points represented by circles) and the vertical mounting position (measurement points represented by squares). The dependency on the pressure again exhibits the course already known for lamps pinched on one end. The transition point is at about 8 bar of operating pressure. The corresponding high-voltage version (230 V/40 W), which differs from the medium-voltage version in having different luminous element dimensions, exhibits a similar behavior (FIG. 18). The transition point is somewhat lower, namely at about 5 bar of operating pressure. The dependency on the fill gas ($N_2$, Ar, Kr, Xe) was also investigated. As expected, it was found that the heavy noble gases (Kr, Xe) have the lowest gas loss factor. In the convection-free range, its dependency on the type of gas used is relatively slight.

Finally, FIG. 19 shows the operating performance for a 230 V/150 W lamp. The cylindrical quartz glass bulb with a total length (including pinch) of about 110 mm and with a tube diameter of about 12 mm contains an axial double coil approximately 60 mm in length. The specific coil dimensions depend on the optimization desired, that is, whether the service life or the light yield is optimized. The transition point is relatively high in this case, at approximately 15 bar of operating pressure, corresponding to about 5 bar of cold fill pressure. The plateau behavior already described above is especially pronounced here, so that between 2 and 15 bar, the gas loss factor stays at a value of about 1.05, practically regardless of the fill pressure. The basic design of such lamps is described for instance in U.S. Pat. No. 5,146,134 and in European Patent EP 0 143 917, whose content is hereby expressly incorporated by reference.

Typical inside diameters of the bulb for low-voltage lamps are on the order of magnitude of from 3 to 12 mm and for medium and high-voltage lamps between 6 and 16 mm.

The production of the lamps according to the invention is done as known per se, but the cold fill pressure of the inert gas (for low-voltage lamps this is typically a noble gas or a mixture of noble gases and for high-voltage lamps, especially with lamps pinched on one end, a slight admixture of nitrogen may be advantageous) is set in the vicinity of the upper limit of the convection-free pressure range. In low-voltage lamps, this "operating point" should usually be chosen to be just below the transition point (see FIG. 3); in high-voltage lamps, it is often in the region of the plateau, which in terms of FIG. 19, for instance, extends from the transition point to lower values of the fill pressure.

TABLE 3

| Type | Tungsten wire diameter (μm) | Radiant coil surface area (mm$^2$) | Light yield (lm/W) | Coil temperature at mid-coil (K) | Color temperature (K) |
| --- | --- | --- | --- | --- | --- |
| 12 V 5 W | | | | | |
| High pressure 13 bar | 37.61 | 4.34 | 12 | 2675 | 2700 |
| Low pressure 1 bar | 41.04 | 5.73 | 12 | 2605 | 2625 |
| 12 V 10 W | | | | | |
| High pressure 13 bar | 60.02 | 8.95 | 14 | 2760 | 2800 |
| Low pressure 1 bar | 65.52 | 11.79 | 14 | 2710 | 2700 |

We claim:

1. An incandescent halogen lamp comprising:

a lamp bulb;

a light emitting filament forming a luminous element, and a halogen containing fill gas, within the bulb; and power leads connecting the filament to external electrical power connections, wherein:

the bulb has an inside diameter, in low-voltage rated lamps, between 3 and 12 mm or, in high- or medium-voltage rated lamps, between 8 and 15 mm, wherein low-voltage rated lamps are lamps rated at 60 V or less, and high- or medium-voltage rated lamps are rated at over 200 V, or between 60 and 200 V, respectively;

the fill volume of the bulb, in low-voltage rated lamps, is between 0.05 and 1 cm$^3$ or, in high or medium-voltage rated lamps, is up to 15 cm$^3$; and wherein the fill gas is an inert gas with a small admixture of a halide, and the cold fill pressure of the fill gas is in the range of between 0.1 and 5 bar.

2. The incandescent halogen lamp of claim 1, in combination with a bowl-shaped reflector (21), wherein the cold fill pressure of the fill gas in the lamp is between 0.1 and 1.7 bar; and wherein said reflector has an aperture which is open and devoid of a transparent cover.

3. The incandescent halogen lamp of claim 1, wherein the filament is coiled and is, at least approximately, cylindrically shaped and defines a longitudinal axis, said coiled filament having a transverse dimension in a direction perpendicular to said longitudinal axis; and wherein a spacing at a maximum transverse dimension of the filament, between the filament and the inner wall of the bulb, is less than or equal to the thickness of the Langmuir layer which arises in operation of the lamp.

4. The incandescent halogen lamp of claim 1, wherein the lamp bulb comprises hard glass or quartz glass.

5. The incandescent halogen lamp of claim 1, wherein the bulb (6) is cylindrically shaped.

6. The incandescent halogen lamp of claim 1, wherein:

the bulb (6) is cylindrically shaped, and wherein, in operation, the lamp has a light output of more than 5 lumens/watt.

7. The incandescent halogen lamp of claim 1, wherein the luminous element (6) comprises coiled wire, whose diameter is less than 200 μm.

8. The incandescent halogen lamp of claim 1, wherein the luminous element (6) comprises coiled wire, whose diameter is less than 100 μm.

9. The incandescent halogen lamp of claim 1, wherein the luminous element (6) comprises a coiled wire which is singly or doubly coiled.

10. The incandescent halogen lamp of claim 9, wherein the luminous element at least approximately forms a cylinder, whose length is more than 2 times greater than its diameter.

11. The incandescent halogen lamp of claim 9, wherein the luminous element at least approximately forms a cylinder, whose length is more than 1.5 times greater than its diameter.

12. The incandescent halogen lamp of claim 1, wherein the luminous element is located axially (6) or transversely (6') inside a cylindrical bulb (1).

13. The incandescent halogen lamp of claim 1, wherein the color temperature of the lamp is about 2400 to 3400K.

14. The incandescent halogen lamp claim 1, wherein the lamp is a low-voltage lamp rated up to 60 V operating voltage, pinched on one end.

* * * * *